March 17, 1953     O. GREBE     2,631,431
ELECTROHYDRAULIC ACTUATING DEVICE
Filed July 5, 1950
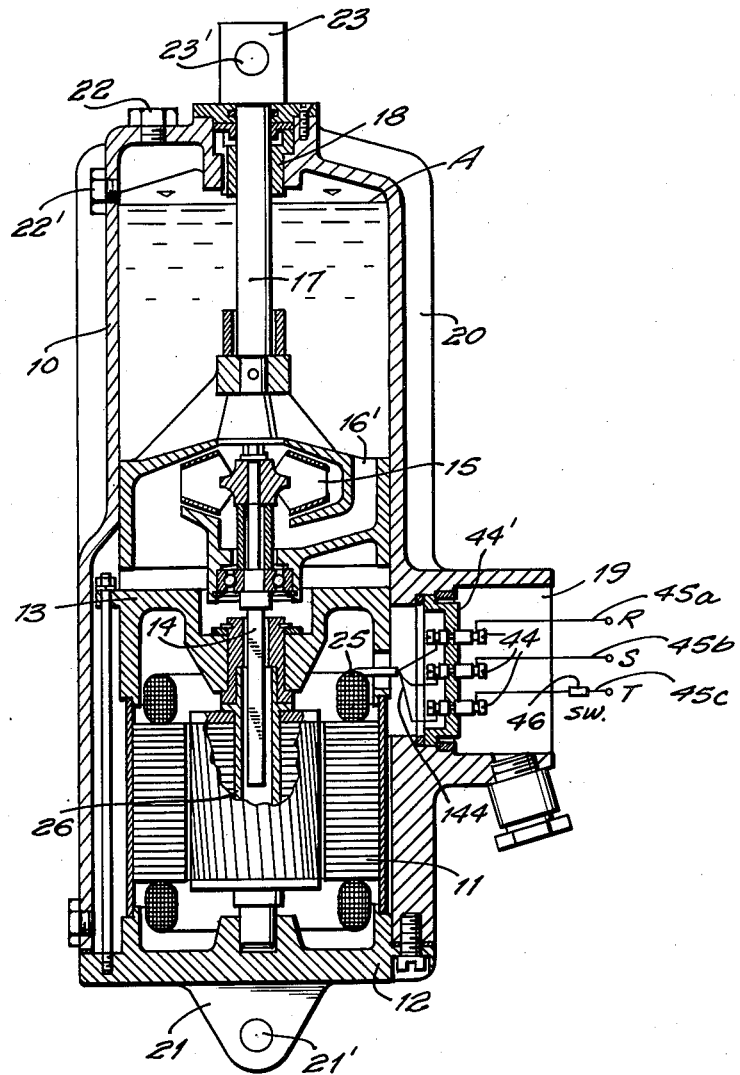
INVENTOR.
OTTO GREBE
BY Patented Mar. 17, 1953

2,631,431

UNITED STATES PATENT OFFICE 2,631,431

ELECTROHYDRAULIC ACTUATING DEVICE

Otto Grebe, Olpe, Germany, assignor to Elektro-Mechanik G. m. b. H., Olpe, Germany Application July 5, 1950, Serial No. 172,181
In Germany July 5, 1949

11 Claims. (Cl. 60—52)

1

The present invention relates to an electro-hydraulic actuating device, and more particularly to such a device comprising an electric motor, a pump coupled with the motor and a piston driven by the oil displaced by the pump.

It is an object of the present invention to provide an electro-hydraulic actuating device of the kind described which permits a maximal load to be taken out of the motor.

It is another object of the present invention to provide an electro-hydraulic actuating device of the kind described which needs the smallest possible quantity of materials of construction.

It is a further object of the present invention to provide an electro-hydraulic actuating device of the kind described having an entirely closed structure.

It is still another object of the present invention to provide an electro-hydraulic actuating device which is sturdy and capable of overcoming heavy loads.

The invention comprises in its broadest aspect in combination an oil tank having walls, an electric motor arranged in the tank and having a hollow shaft, the motor being submerged in oil so as to transfer the heat generated in the motor to the walls of the oil tank substantially by transfer through the oil, a centrifugal oil pump arranged in the tank coaxially to the motor and having a rotating part and a shaft rigidly connected to the rotating part, the shaft engaging the hollow shaft of the electric motor, means for coupling the shafts for rotation, the coupling means permitting a displacement of the shafts with respect to each other in the longitudinal direction thereof, a hollow piston arranged in the tank coaxially to the motor and the pump and being driven by the oil displaced by the pump, the hollow piston enclosing the rotating part of the centrifugal pump and forming the casing thereof, and guiding means arranged in the piston for guiding oil to and from the rotating part of the pump, whereby the centrifugal pump and the piston form a unit which is displaced by the oil in the tank.

Preferably the walls of the tank have cooling ribs arranged on the outside thereof.

The resistance of the rotary parts of the motor against motion in the oil is preferably so high that after a cut-off of the motor the pump exerts a rapid breaking action on the rotary parts and the time period for returning the piston into the initial position thereof is shortened correspondingly.

Preferably the viscosity of the oil at low temperatures is sufficiently high for generating an increased frictional load at the starting of the motor and the pump which heats the oil rapidly to the stationary operating temperature.

Preferably the stator of the motor is a three-winding stator and has three current leads of which two are permanently connected to a source of three-phase current so as to keep one of the phases of the three-phase stator winding permanently connected in order to heat the oil, the starting of the motor being accomplished by a connection of the third one of said current leads to the source of three-phase current.

Preferably means such as fuses connected to the stator winding, are arranged in the oil for cutting off the stator winding at a predetermined temperature of the oil.

Preferably the tank is filled with an oil having a high specific gravity such as chlorinated diphenyl having a specific gravity of approximately 1.5.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a sectional elevation of an embodiment of the present invention.

Referring now to the drawing an oil tank 10 is shown which encloses all important parts of the apparatus and serves as a cylinder for the piston 16. In the lower portion or first chamber of the tank 10 an electric motor 11 is arranged which has a lower bearing plate 12 and an upper bearing plate 13, the lower bearing plate 12 forming the end plate at the bottom of the tank 10. The shaft 26 of the motor 11 is hollow and surrounds at least partly a solid shaft 14 having preferably a square cross-section so that it rotates together with the shaft 26, but is displaceable thereto in the axial direction thereof. Instead the shaft 14 can be provided with a key which slides in a longitudinal groove provided in the shaft 26. A centrifugal pump 15 has a rotating part which is connected to the shaft 14, the housing of the rotating part being formed by a hollow piston 16 arranged for axial displacement in the tank 10. A piston rod 17 is connected to the piston 16 and leads upwards through a gasket 18. The piston rod 17 ends in a preferably square piece 23 provided with an eyelet 23' for connection to the device to be actuated (not shown). The tank 10 is provided with an extension 19 in which terminals 44 are arranged to which the current leads 14a of the stator winding 25 of the motor 11 are connected. The terminals 44 are arranged in an insulating wall 44' sealing the interior of the extension 19 against the interior of the tank 10. The latter has a wall provided with cooling ribs 20 on the outside thereof. Furthermore the lower bearing plate 12 is provided with an extension 21 having an eye 21' for connecting the device to a machine part (not shown) or the like. A screw 22 closes an aperture in the upper part or second chamber of the tank 10 which serves for filling oil into the tank.

The operation of this device is as follows:

The tank 10 is filled with oil up to a level A corresponding to an overflow aperture closed by a screw 22'. If the motor 11 and the pump 15 are started the oil is sucked from the space above the piston 16 to the space below the same so that the piston 16 moves together with the pump 15 as a unit and actuates the device (not shown), such as a brake, a press or the like, connected to the piston rod 17 by means of the eyelet 23' provided in the square end piece 23. If the motor 11 is stopped the piston 16 and the pump 15 are axially displaced downwards as a unit by the force of a spring or a weight (not shown) which are tensioned or lifted, respectively, during the working stroke. During this stage of the operation the oil flows from the lower side of the piston 16 to the upper side thereof, the piston 16 being provided with a channel 16' to allow the escaping of the oil from one side thereof to the other.

As will be understood from the drawing, not only the pump 15 and the piston 16 are submerged in oil but also the windings 25 of the motor 11. In this manner local heatings of the windings 25 which occur for instance if only one phase of the winding is supplied with current are avoided or balanced and the overloaded winding is protected against burning. If desired the windings 25 of the motor 11 can be impregnated with an oil-proof lacquer. If the motor 11 has a cage armature the cage is provided with an oil-proof layer of lacquer or tin.

Preferably the resistance of the rotating parts, particularly of the rotor of the motor, against the liquid is so chosen that at a stopping of the motor the pump is braked as rapidly as possible thereby reducing the time period which the piston 16 needs to return into the initial position thereof. As a further means for reducing this time period the viscosity of the oil is chosen in dependence on the temperature in such a manner that at the stationary operating temperature of the liquid, for instance 75° C., sufficient resistance of the liquid is left for braking the rotating parts. Furthermore it is advantageous in many cases to use as a liquid an oil having a high viscosity at low temperatures so that in starting the motor and the pump an increased frictional load is generated which heats the oil rapidly to the stationary temperature thereof.

The output losses of the motor decrease with increasing temperature of the oil to such an extent that in the stationary condition the heat withdrawn through the surface of the tank equals the output losses. The ribs 20 increase the outer surface of the tank 10 and cooperate in maintaining the equilibrium between heat withdrawn and output losses as far as possible. If the device according to the present invention is subjected to low outer temperatures also, a three-phase motor is preferably used having three-phase windings of which one phase is permanently connected to the phases R and S of the current supply by means of two leads 45a and 45b. If it is intended to start the motor the third lead 45c is connected to the third phase T of the current supply by means of a switching arrangement 46 which can be such that the motor is cut off with all three phases, and the two leads 45a, 45b connected to the phase winding heating the oil while the motor is not running are connected to the current supply with a delay guaranteeing a safe stopping of the electric motor. If desired, the motor can be operated after the cutting off of the operating voltage with a strongly reduced voltage and a diminished number of rotations per minute by means of resistances bridging the switch cutting off the operating voltage, said resistances being preferably combined with the switch. Normal three-phase motors with squirrel-case armatures can be used as driving motors with which a single phase operation is rendered possible by connecting the third phase through a condenser to the current source.

As shown in the drawing the piston 16 and the upper bearing plate 13 have equal outer diameters. In consequence thereof, the tank 10 forming the cylinder for the piston 16 has only to be bored to a single internal diameter. However, in some embodiments the diameter of the piston exceeds the diameter of the motor. In this case the diameter of the tank 10 is kept uniform over its entire length and the upper bearing plate 13 is adapted to the diameter of the tank by means of a flange. The motor shaft 26 housing the square shaft 14 is preferably provided with an axial boring extending to the lower portion thereof and provided with exit openings at the lower end thereof which communicate with the oil in the lower end portion of the tank which is not under pressure. Thus it is accomplished that any oil penetrating into the hollow shaft of the motor during the working stroke can flow out downwards during the return stroke without causing a dampening effect which would lengthen the return time of the piston in a disadvantageous manner.

If desired, the upper part of the tank 10 can be narrowed like a bottle so that even at strongly inclined positions of the tank the entrance of the pump is always covered by oil even in the uppermost position thereof. If the device is provided with a lift valve and a return valve for adjusting the lifting and the returning times, respectively, the adjusting members of these valves are preferably so arranged that they can be adjusted through the aperture closed by the screw 22. For the protection of the motor windings temperature-responsive switches such as bimetallic switches for each of the phase windings of the motors may be provided which cut the windings off at a temperature between 100° and 120° C. so that the motor is effectively protected against serious disturbances such as short circuits. As a further protection an excess pressure valve may be provided which can be adjusted to an excess pressure of five atmospheres and for instance be arranged in the screw 22.

Preferably the liquid is an oil having a high specific gravity such as chlorinated diphenyl having a specific gravity of approximately 1.5.

It will be understood that each of the elements described above, or two or more together, may also find a useful application in other types of electro-hydraulic actuating devices differing from the types described above.

While I have illustrated and described the invention as embodied in an electro-hydraulic actuating device comprising an electric motor, a pump coupled with the motor, and a piston driven by the oil displaced by the pump, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An electro-hydraulic actuating device comprising in combination, an oil tank having walls; an electric motor arranged in said tank and having a hollow shaft, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and guiding means arranged in said piston for guiding oil to and from said rotating part of said pump, whereby said centrifugal pump and said piston form a unit which is displaced by the oil in said tank.

2. An electro-hydraulic actuating device, comprising in combination, an oil tank having walls; an electric motor arranged in said tank and having a hollow shaft, said motor being submerged in oil so as to transfer the heat generated in said motor to said walls of said oil tank substantially by transfer through the oil; a centrifugal oil pump arranged in said tank coaxially to said motor and having a rotating part and a shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and a channel formed in said piston, said channel leading to said rotating part of said pump so as to guide oil to and from said rotating part of said pump, whereby said centrifugal pump and said piston form a unit which is displaced by the oil in said tank.

3. An electro-hydraulic actuating device, comprising in combination, an oil tank having walls, said tank defining a first chamber and a second chamber, said second chamber having a closed end forming one piece with said walls of said tank; an electric motor arranged in said first chamber of said tank and having a hollow shaft, said motor being submerged in oil so as to transfer the heat generated in said motor to said walls of said oil tank substantially by transfer through the oil; a centrifugal oil pump arranged in said second chamber of said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; a piston rod rigidly connected to said piston and leading through said second chamber and said closed end thereof to the outside of said tank; and guiding means arranged in said piston for guiding oil to and from said rotating part of said pump, whereby said centrifugal pump and said piston form a unit which is displaced by the oil in said tank.

4. An electro-hydraulic actuating device, comprising in combination, an oil tank having walls, said tank defining a first chamber and a second chamber, said second chamber having a closed end forming one piece with said walls of said tank, said first chamber having an open end; a plate arranged so as to close said open end of said first chamber and form the bottom of said tank; an electric motor arranged in said first chamber of said tank and having a hollow shaft, said motor being supported by said plate and submerged in oil so as to transfer the heat generated in said motor to said walls of said oil tank substantially by transfer through the oil; a centrifugal oil pump arranged in said second chamber of said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; a piston rod rigidly connected to said piston and leading through said second chamber and said closed end thereof to the outside of said tank; and guiding means arranged in said piston for guiding oil to and from said rotating part of said pump, whereby said centrifugal pump and said piston form a unit which is displaced by the oil in said tank.

5. An electro-hydraulic actuating device, comprising in combination, an oil tank having walls; an electric motor arranged in said tank and having a hollow shaft; cooling ribs arranged on the outside of said walls of said tank, said motor being submerged in oil so as to transfer the heat generated in said motor to said cooling ribs of said walls of said oil tank substantially by transfer through the oil; a centrifugal oil pump arranged in said tank co-axially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centfirugal pump and forming the casing thereof; and guiding means arranged in said piston for guiding oil to and from said rotating part of said pump, whereby said centrifugal pump and said piston form a unit which is displaced by the oil in said tank.

6. An electro-hydraulic actuating device, comprising in combination, an oil tank having walls, said tank defining a first chamber and a second chamber, said second chamber having a closed end forming one piece with said walls of said tank, said first chamber having an open end; a plate arranged so as to close said open end of said first chamber and form the bottom of said tank; an electric motor arranged in said first chamber of said tank and having a hollow shaft; cooling ribs arranged on the outside of said walls of said tank, said motor being supported by said plate and submerged in oil so as to transfer the heat generated in said motor to said cooling ribs of said walls of said oil tank substantially by transfer through the oil; a centrifugal oil pump arranged in said second chamber of said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; a piston rod rigidly connected to said piston and leading through said second chamber and said closed end thereof to the outside of said tank; and guiding means arranged in said piston for guiding oil to and from said rotating part of said pump, whereby said centrifugal pump and said piston form a unit which is displaced by the oil in said tank.

7. An electro-hydraulic actuating device, comprising in combination, an oil tank having walls; an electric motor arranged in said tank and having a hollow shaft, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and guiding means arranged in said piston for guiding oil to and from said rotating part of said pump, whereby said centrifugal pump and said piston form a unit which is displaced by the oil in said tank, the viscosity of the oil at low temperatures being sufficiently high for generating an increased frictional load at the starting of said motor and said pump, said increased friction heating the oil rapidly to operating temperature.

8. An electro-hydraulic actuating device, comprising in combination, an oil tank having walls; an electric motor arranged in said tank and having a three-phase stator winding having three current leads, a rotor, and a hollow shaft connected to said rotor, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and guiding means arranged in said piston for guiding oil to and from said rotating part of said pump, whereby said centrifugal pump and said piston form a unit which is displaced by the oil in said tank, two of said current leads being permanently connected to a source of three-phase current so as to keep one of the phases of said three-phase stator winding permanently connected in order to heat the oil, the starting of said motor being accomplished by a connection of the third one of said current leads to the source of three-phase current.

9. An electro-hydraulic actuating device, comprising in combination, an oil tank having walls; an electric motor arranged in said tank and having a stator winding, a rotor, and a hollow shaft connected to said rotor, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; guiding means arranged in said piston for guiding oil to and from said rotating part of said pump, whereby said centrifugal pump and said piston form a unit which is displaced by the oil in said tank; and means for cutting off said stator winding at a predetermined temperature.

10. An electro-hydraulic actuating device, comprising in combination, an oil tank having walls and being filled with oil having a high specific gravity; an electric motor arranged in said tank and having a hollow shaft, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and guiding means arranged in said piston for guiding oil to and from said rotating part of said pump, whereby said centrifugal pump and said piston form a unit which is displaced by the oil in said tank.

11. An electro-hydraulic actuating device, comprising in combination, an oil tank having walls and being fiilled with chlorinated diphenyl having a specific gravity of approximately 1.5; an electric motor arranged in said tank and having a hollow shaft, said motor being submerged in oil so as to transfer the heat generated in said motor to said walls of said oil tank substantially by transfer through the oil; a centrifugal oil pump arranged in said tank coaxially to said motor and having a rotating part and a shaft rigidly connected to said rotating part, said shaft engaging said hollow shaft of said electric motor; means for coupling said shafts for rotation, said coupling means permitting a displacement of said shafts with respect to each other in the longitudinal direction thereof; a hollow piston arranged in said tank coaxially to said motor and said pump and being driven by the oil displaced by said pump, said hollow piston enclosing said rotating part of said centrifugal pump and forming the casing thereof; and guiding means arranged in said piston for guiding oil to and from said rotating part of said pump, whereby said centrifugal pump and said piston form a unit which is displaced by the oil in said tank.

OTTO GREBE.

REFERENCES CITED

The following references are of record in the file of this patent:

UNITED STATES PATENTS

| Number | Name | Date |
| --- | --- | --- |
| 1,993,612 | Lum | Mar. 5, 1935 |
| 2,035,813 | Johnson | Mar. 31, 1936 |
| 2,276,591 | Ray | Mar. 17, 1942 |
| 2,308,731 | White | Jan. 19, 1943 |